3,660,468
CARBOXY-PERESTERS
Wilbur H. McKellin, Buffalo, N.Y., assignor to
Pennwalt Corporation
No Drawing. Filed May 7, 1968, Ser. No. 727,379
Int. Cl. C07c *73/00*
U.S. Cl. 260—488 F          7 Claims

ABSTRACT OF THE DISCLOSURE

Certain compounds including a free carboxyl group and a perester group are efficient free radical generators for polymerization of monomers in aqueous medium. For example: Emulsion polymerization of styrene, vinyl chloride, and methyl methacrylate using t-butyl peroxymethylsuccinic acid and t-butyl peroxy-2-carboxybenzoate.

New mono-peresters of α,α-disubstituted malonic acid, such as t-butyl peroxy-α-carboxyisobutyrate, t-butyl peroxy(1-carboxy)-cyclohexane carboxylate, t-butyl peroxy-2-carboxy-2-phenylbutyrate and 1,1,4,4-tetramethyl tetramethylene bis(peroxy-α-carboxyisobutyrate).

BACKGROUND OF THE INVENTION

(1) Field of the invention

This invention relates to the polymerization of monomers in aqueous medium using a water soluble free radical generating initiator containing both a free carboxyl group and a perester group. Also the invention relates to a new class of compounds: mono-peresters of α,α-disubstituted malonic acid.

(2) Description of the prior art

Certain diperesters and mixed perester-ester derivatives of α-substituted or α,α-disubstituted malonic acid are known and have been used in bulk polymerization of ethylene and vinyl monomers. Mixed perester-ester derivatives have been used in emulsion polymerization. The following are of interest:

(1) British Pat. 678,216 issued Aug. 27, 1952.
(2) U.S. Pat. 3,341,507 issued Sept. 12, 1967.
(3) Gortler and Saltzman, J. Org. Chem. 31, 3821 (1966).
(4) Bartlett and Gortler, J. Am. Chem. Soc. 85, 1864 (1963).
(5) U.S. Pat. 2,698,863 issued Jan. 4, 1955.

SUMMARY OF THE INVENTION

It has been discovered that the class of perester compounds having carboxylic acid groups in the molecule can be used at temperatures below that commonly employed or predicted by determination of the half-life of the perester, as determined in organic solvents, by activation and use of the carboxy-containing peresters in aqueous systems and even more remarkably, in mildly alkaline aqueous systems and solutions.

In another valuable aspect of this invention, the carboxy peresters are outstandingly useful as water soluble initiators. Obviously the actual solubility of the compound is related to the number of carbon atoms in the molecule, but in mildly alkaline solutions, a great increase in the solubility is obtained as expected by the formation of the carboxylate ion. Completely unexpected is the remarkable effect of the alkalinity of the aqueous system on the thermal stability, and ultimately on the utility, of the carboxy peresters. The magnitude of this effect also appears to be again related to the proximity of the carboxylate group to the carbonyl group of the perester. (Without wishing to be restricted to any particular mechanism or theoretical explanation for the remarkable effects observed in this discovery, it seems possible that the electronic effects of carboxylate ion formation cause a decrease in the stability in the peroxidic linkage of the perester group.) Activation of the perester group by the normal dissociation of the carboxyl group in the aqueous systems is further increased as the alkalinity of the aqueous system is increased and progressive formation of carboxylate ion takes place.

The process of the invention is directed to free radical initiated polymerization of monomers in an aqueous medium, preferably in emulsion polymerization, at a pH of about 7–8.5, using a catalytic amount of a free radical generating polymerization initiator defined by the formula:

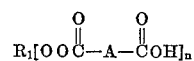

where (a) A is (i) an aliphatic, cycloaliphatic or aromatic biradical having 2–20 carbon atoms and having a structure such that 2–3 carbon atoms separate said

groups, and (ii)

(b) n is 1 or 2;
(c) $R_1$ is an aliphatic or cycloaliphatic radical having 4–20 carbon atoms wherein the carbon atom joined to a peroxy oxygen atom is a tertiary carbon atom;
(d) $R_2$ and $R_3$ are aliphatic, cycloaliphatic, or aromatic radicals having 1–12 carbon atoms; and

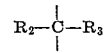

together can form a cyclic group.

The new compounds of the invention are defined by the formula:

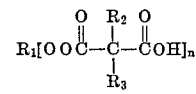

II.

where (1) n is 1 or 2;
(2) $R_1$ is an aliphatic or cycloaliphatic radical wherein the carbon atoms joined to the peroxy oxygen atom is a tertiary carbon atom having at least 4–20 carbon atoms;
(3) $R_2$ and $R_3$ are aliphatic, cycloaliphatic or aromatic radicals having at least 1–12 carbon atoms; and
(4) $R_2$, $R_3$ and C together can form a cyclic group.

Illustrative compounds are:

(1) t-Butyl peroxy-α-carboxyisobutyrate.
(2) t-Butyl peroxy-(1-carboxy)-cyclohexanecarboxylate.
(3) t-Butyl peroxy-2-carboxy-2-phenylbutyrate.
(4) 1,1,4,4 - tetramethyltetramethylene bis(peroxy-α-carboxyisobutyrate).
(5) t-Butyl peroxy-2-carboxy-2-ethylbutyrate.

DESCRIPTION OF THE INVENTION AND EXAMPLES

The carboxy-peresters of Formulas I and II are unexpectedly excellent free radical generating initiators for polymerization of monomers in aqueous medium where the free radicals are generated in the water. Because of their water solubility these initiators are of particular interest in emulsion polymerization of monomers where polymerization can be initiated by free radicals.

These initiators are useful at temperatures far below those predicted from the usual half-life data. The optimum temperature of polymerization is dependent upon the structure of the particular carboxy-perester, but in general these can be described as exceptional low temperature initiators, i.e., below about 80° C. and usually below about 50° C.

These initiators may be used with any monomer whose polymerization in aqueous medium can be initiated by free radicals, which radicals are generated in the water phase. Illustrative monomers are: vinyl halides; vinylidene halides; vinyl esters such as vinyl acetate and vinyl stearate; the vinylbenzenes such as styrene itself, α-methylstyrene and vinyltoluene; the acrylics such as acrylic acid, methyl methacrylate and ethyl acrylate. These vinyl monomers are preferred. Other monomers are: The styrene-butadiene blends for rubber copolymers; styrene-acrylonitrile blends for copolymers. Fluoroethylenes and chloro-fluoroethylenes. Butadiene and similar polymerizable dienes, alone.

These initiators are distinguished by their usefulness over a wide range of pH of aqueous medium—from highly acid of about pH=1 to mildly alkaline of about pH=10. Especially suitable is the pH range of about 7 to 8.5.

The catalytic amount used will vary with the particular initiator and with operating conditions; however, as a class these are efficient initiators.

The following comments are of interest in showing the flexibility obtainable by the use of initiators of Formulas I and II in aqueous medium polymerization of vinyl monomers.

By the proper choice of the substituents on the central carbon atom of the malonic acid the activity of the peresters can be varied widely giving added utility to this new class of compounds. As illustration of this effect, the thermal stability of the perester as evidenced by the determination of the half-life in organic solvents is decreased as the carbon chain length of the aliphatic groups attached to the central carbon atom is increased. A further decrease in thermal stability is observed when even one of the substituents is an aromatic group. Further alteration in the thermal stability of these carboxy peresters has been achieved by substitution, in for instance, the aliphatic group.

This effect of substitution while particularly valuable in the case of the disubstituted malonic acid derivatives is also applicable to the carboxy peresters generally.

Another effect observed in the case of the malonic acids was the remarkable effect on the thermal stability of the carboxy perester when the aliphatic groups attached to the central carbon atom of the malonic acid taken together formed an aliphatic cyclic ring. Illustrative of this is the marked increase in the thermal stability of t-butyl peroxy-1-carboxycyclobutanecarboxylate as compared to that of t-butyl peroxy-1-carboxycyclohexanecarboxylate.

A particularly important effect discovered in this new activation of peresters containing carboxyl groups in aqueous systems is the effect of the proximity of the carboxyl group to the carbonyl group of the perester. The greatest effect has been found when the carboxyl group is separated from the carbonyl group of the perester by only one carbon atom, a somewhat diminished effect when separation is by two carbon atoms and a still further diminished effect when separation is by more than two carbon atoms. It should be emphasized that the effect of the carboxyl group in aqueous systems is in addition to the known effects of the structure of the acid portion of the molecule on the thermal stability of the perester.

The formation of carboxylate ion in aqueous alkaline systems serves a variety of useful purposes which increase the utility of the carboxy peresters. As already indicated above, solubility of the initiator in emulsion polymerization systems is enhanced and polymerization can be carried out in a simple, easily formulated reaction mixture. Since the thermal stability of the perester is greatly decreased in aqueous systems in the examples of the disubstituted malonic acid derivatives, relative to the stability of the carboxy perester by itself or in organic solvents, initiation of polymerization at low or moderate temperatures is possible using these initiators without the necessity of providing for special storage and handling facilities often required for low temperature initiators. Carboxy peresters which are normally low temperature initiators can be effective at still lower temperatures when used under the conditions of this invention.

In another advantage of this discovery, the control of the polymerization in aqueous emulsion systems is amenable to a degree of control not ordinarily easily attained using conventional peresters. The conventional emulsion systems employing persulfates or hydroperoxides can be very sensitive to extremely small amounts of activators such as trace amounts of iron as in the case of the hydroperoxides or they can subject the polymerization system to steadily increasing amounts of acid as in the persulfate initiated reactions. If desired the rate of initiation using the carboxy perester can be controlled by the controlled addition of a mildly alkaline agent such as aqueous sodium bicarbonate, sodium carbonate or very dilute sodium hydroxide solutions to the emulsion system containing the monomer and initiator. It is also possible in this way to maintain the pH of the emulsion system within very narrow limits and of particular importance emulsion polymerizations can be carried out at almost exactly neutral pH's with monomers that are particularly susceptible to strongly acidic or strongly alkaline conditions. Improved polymer properties can thus be obtained and polymers free of potentially undesirable initiator residues common with other activated initiator systems can easily be obtained without the necessity of carrying out extensive purification procedures. If complete removal or decomposition of even traces of initiator is desired or required, acceleration of the rate of the initiator decomposition can readily be achieved with carboxy peresters by an increase in the alkalinity of the system.

The advantages of the carboxy peresters are obviously of greater importance in the utilization of peroxidic compounds in low and moderate temperature reactions than in higher temperature systems and as a result the aliphatic peresters which usually operate at lower temperatures than the aromatic peresters are more generally useful in the practice of this invention although it is not intended to restrict this invention to the use of aliphatic peresters. (It is also important to note that the polymerizations carried out to demonstrate the utility of this invention were carried out at temperatures and under reaction conditions which would as much as possible magnify the defferences between the initiators employed and still show that high conversions of monomers to polymers could be obtained in systems employing these initiators.)

A variety of vinyl type monomers have been polymerized in both emulsion and suspension systems to illustrate the versatility of this invention. With increase in the temperature of the reactions, initiators which appear in the working examples to be poor initiators give the desired polymerizations although at a slower rate than the initiators which are operable at lower temperatures. (See Examples XXXVII–A and XXXVII–B.)

Further control over the normal thermal stability of the carboxy perester can be achieved by the proper choice of the hydroperoxide used to esterify the carboxy acid chloride or to react with the acid anhydride in the conventional methods employed for the preparation of peresters. The stability of the related peresters is decreased, for example, as the hydroperoxide is changed from t-butyl to t-amyl to 1,1,3,3-tetramethylbutyl hydroperoxides.

Hydroperoxides useful in preparing the peresters of this invention are illustrated to include t-butyl hydroperoxide, t-amyl hydroperoxide, chloro-t-butyl hydroperoxide, cumyl hydroperoxide, p-menthanyl hydroperoxide, pinanyl hydroperoxide, 1,1,3,3-tetramethylbutyl hydroperoxide, 2-methyl-2-hydroperoxy-4 - hydroxypentane, 2,5-dimethyl-2,5-dihydroperoxyhexane, 2,5-dimethyl - 2,5-dihydroperoxy-3-hexyne, and diisopropylbenzene hydroperoxides.

A is (i) an aliphatic, cycloaliphatic or aromatic biradical having 2–20 carbon atoms and having a structure such that 2–3 carbon atoms separate the two carbonyl groups

in Formula I, or —C(R$_2$)(R$_3$)— group. For purposes of illustration only, the separation of the two carbonyl groups in (i) above may be:

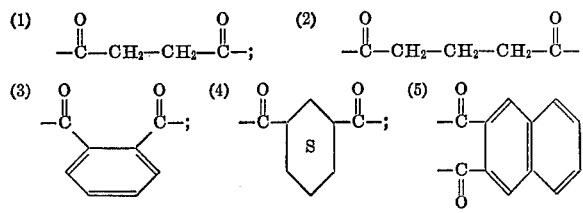

Generally A(i) is alkylene, cycloalkylene having 4–6 carbon atoms in the ring, or phenylene, including lower alkyl substituents on the ring.

In all instances it is to be understood that any non-hydrocarbon substituents in I and II will be inert to the carboxy and peroxy groups and will not interfere with the vinyl polymerization.

The group

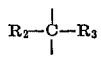

together can form a cyclic group, for example a 1,1-cycloaliphatic biradical.

R$_2$ and R$_3$ are the same or different aliphatic, cycloaliphatic or aromatic radicals having 1–12 carbon atoms each. Generally these are alkyl, cycloalkyl having 4–6 carbon atoms in the ring, or phenyl, including lower alkyl substituents on the ring.

$n$ is an integer equal to 1 or 2. To illustrate:

(a) when $n=1$,

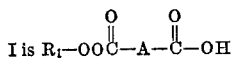

(b) when $n=2$,

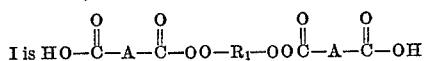

R$_1$ is an aliphatic or cycloaliphatic radical having 4–20 carbon atoms wherein the carbon atom joined to a peroxy oxygen atom is a tertiary carbon atom.

When $n$ is 1, R$_1$ is illustrated by the following monovalent radicals:

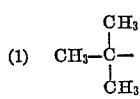 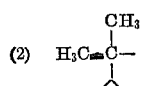 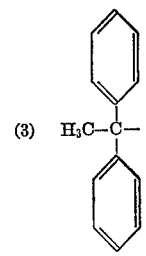

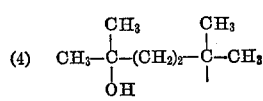 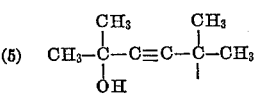

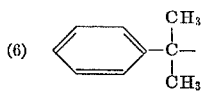 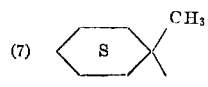

When $n$ is 2, R$_1$ is illustrated by the following biradicals:

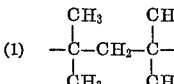 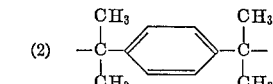

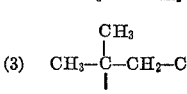 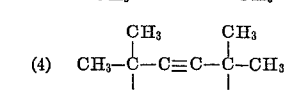

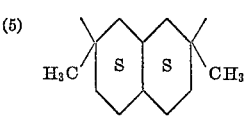

Generally R$_1$ contains only carbon and hydrogen atoms and the cyclic radicals have only one ring with the cycloaliphatic radical having 4–6 carbon atoms in the ring.

The novel compounds of the invention are defined by the Formula II:

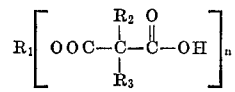

where $n$, R$_1$, R$_2$, and R$_3$ are as defined above. Numerous illustrations are given in the working examples.

EXAMPLES

Compounds usable in the process invention whether or not they come within the novel class defined by II have been prepared and used in processes typical of vinyl polymerization in aqueous medium. Utility of the novel class II is also demonstrated by the curing (cross-linking) of a typical unsaturated polyester resin-styrene mix. Certain comparative tests were carried out which are identified as such, even though numbered according to the example sequence. It is to be understood that these examples do not limit the compound invention to the compounds shown and the process invention either to the initiators used or the polymerization processes shown.

EXAMPLE I (A) Preparation of α-carboxyisobutyryl chloride

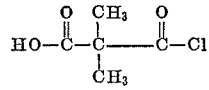

To a solution of 78.0 g. (0.592 mole) of dimethylmalonic acid dissolved in 180 ml. of isopropyl ether, 78.0 g. (0.660 mole) of thionyl chloride was added while the mixture was stirred in a 500 ml. flask. The reaction mixture was heated to 45° C. for five hours.

The solvent and unreacted thionyl chloride were removed under reduced pressure. The product was dissolved in pentane, decolorized with activated carbon and the pentane evaporated. A yield of 77.7 g. (87% of theoretical) was obtained, M.P. 64–66° C. (lit. M.P. 64–65° C.). Calculated (percent): Cl, 22.9. Found (percent): Cl, 21.4: Assay 91%.

(B) Preparation of t-butyl peroxy-α-carboxyisobutyrate

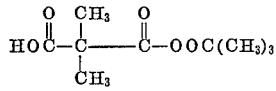

A reactor containing 107.6 g. (0.32 mole) of 20% potassium hydroxide solution was stirred at 0° C. while 18.0 g. (0.2 mole) of 90% t-butyl hydroxide was added. Stirring was continued at 0–5° C. while 24.0 g. (0.15 mole) of α-carboxyisobutyryl chloride dissolved in 30 ml. of ether was added over twenty minutes. The reaction mixture was stirred for one hour, the cold aqueous solution extracted with ether and the aqueous layer acidified to pH 1 with dilute hydrochloric acid. The product was taken up in ether, the ether solution washed with 150 ml. of 10% sodium bisulfite solution and water. The ether solution was dried over anhydrous magnesium sulfate and the ether removed under reduced pressure.

Recrystallization of the product from pentane gave 25.8 g. of product M.P. 66–68° C. Calculated: Active (O), 7.85; Found: Active (O) 7.73; percent Cl, <0.1%; Assay 98.7%.

EXAMPLE II

Preparation of t-cumyl peroxy-2-carboxy-2-methylpropionate

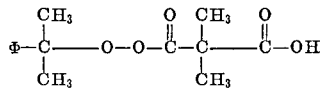

A mixture of 3.0 g. (0.020 mole) of 85% cumyl hydroperoxide, 4.72 g. (0.06 mole) of pyridine and 150 ml. of ether was stirred at 0° C., while 3.84 g. (0.024 mole) of α-carboxyisobutyryl chloride was added slowly. The reaction mixture was allowed to warm slowly to 25° C. The total stirring time after addition of the acid chloride was 2 hours. The reaction mixture was diluted with water, the ether solution washed with 10% tartaric acid solution and extracted with 10% sodium bicarbonate solution. Acidification of the alkaline extract with dilute hydrochloric acid and extraction with ether gave an ether solution of the product which was dried over anhydrous magnesium sulfate. The ether was removed under reduced pressure giving a 4.11 g. recovery of product containing 7.8% of the desired product as determined by active oxygen assay. The yield of product was 6.2%.

EXAMPLE III

Preparation of t-butyl peroxy-2-carboxy-2-phenylpropionate

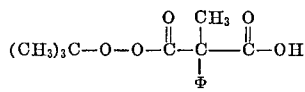

A mixture of 7.21 g. (0.08 mole) of t-butyl hydroperoxide, 14.1 g. (0.066 mole) of 71.5% 2-carboxy-2-phenylpropionyl chloride and 200 ml. of ether was stirred at 0° C., while 15.8 g. (0.2 mole) of pyridine was added over a period of 25 minutes. The reaction mixture was then allowed to warm to 25° C. over 3 hours. The reaction mixture was transferred to a separatory funnel, the ether solution diluted with water and washed with dilute hydrochloric acid and tartaric acid solution, sodium bisulfite solution, and water. The ether solution was dried over anhydrous magnesium sulfate, and the ether removed under reduced pressure. The product recovered weighed 9.0 g. and contained 47% of the desired product as determined by active oxygen assay. The yield of product was 23.9%.

EXAMPLE III

Preparation of t-butyl peroxy-2-carboxy-2-phenylpropionate

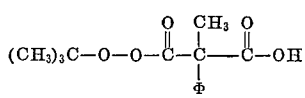

A mixture of 7.21 g. (0.08 mole) of t-butyl hydroperoxide, 14.1 g. (0.066 mole) of 71.5% 2-carboxy-2-phenylpropionyl chloride and 200 ml. of ether was stirred at 0° C., while 15.8 g. (0.2 mole) of pyridine was added over a period of 25 minutes. The reaction mixture was then allowed to warm to 25° C. over 3 hours. The reaction mixture was transferred to a separatory funnel, the ether solution diluted with water and washed with dilute hydrochloric acid and tartaric acid solution, sodium bisulfite solution, and water. The ether solution was dried over anhydrous magnesium sulfate, and the ether removed under reduced pressure. The product recovered weighed 9.0 g. and contained 47% of the desired product as determined by active oxygen assay. The yield of product was 23.9%.

EXAMPLE IV

Preparation of t-butyl peroxy-2-carboxy-2-phenylbutyrate

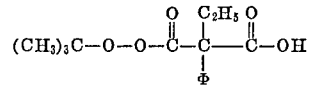

A mixture of 10.8 g. (0.12 mole) of t-butyl hydroperoxide, 23.68 g. (0.30 mole) of pyridine and 200 ml. of ether was stirred at 0° C., while 25.90 g. (0.11 mole) of 88% 2-carboxy-2-phenylbutyryl chloride was added over a period of fifteen minutes. The reaction mixture was stirred for an additional 3 hours, while the temperature was allowed to rise slowly to 25° C. The reaction mixture was diluted with water, the ether layer separated and washed with 10% tartaric acid solution, 10% sodium bisulfite solution and then treated with 10% sodium hydroxide solution and the ether layer decanted. The alkaline solution was acidified to pH 1 with hydrochloric acid, ether added and the ether layer washed with water. The ether solution was dried over anhydrous magnesium sulfate and the ether removed under reduced pressure. The product recovered weighed 20.4 g., and contained 47.6% of the desired product as determined by active oxygen assay. The yield of product was 33.8%.

EXAMPLE V

Preparation of t-butyl peroxy-2-carboxy-2-methylundecanoate

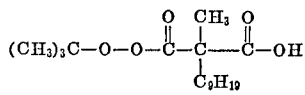

A solution of 6.75 g. (0.075 mole) of 90% t-butyl hydroperoxide and 25.20 g. (0.09 mole) of 20% potassium hydroxide solution was stirred at 0±2° C., while 18.6 g. (0.07 mole) of 76.2% assay. 2-carboxyl-2-methylundecanoyl chloride was added over a period of 15 minutes. The reaction mixture was stirred at 0° C. for two hours, 25 ml. of ether added, and the ether layer separated. The aqueous alkaline layer was acidified to pH 1 with dilute hydrochloric acid and the product taken up in ether. The ether solution of the product was washed with water, dried over anhydrous magnesium sulfate and the ether removed under reduced pressure. The product recovered weighed 19.4 g. and contained 76% of the desired product as determined by active oxygen assay. The yield of product was 67.2%.

EXAMPLE VI

Preparation of 1,1,4,4-tetramethyltetramethylene bis(peroxy-α-carboxyisobutyrate)

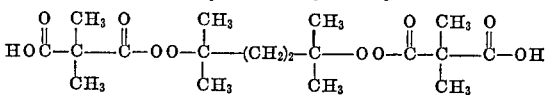

A mixture of 9.39 g. (0.05 mole) of 95% 2,5-dimethyl-2,5-dihydroperoxyhexane, 19.8 g. (0.25 mole) of pyridine and 200 ml. of ether was stirred at 0° C., while 15.06 g. (0.10 mole) of α-carboxyisobutyryl chloride dissolved in 20 ml. of ether was added over a period of 20 minutes. The reaction mixture was then allowed to warm slowly to 25° C., while stirring for a total reaction time, after the addition was completed, of 3 hours. The reaction mixture was then diluted with water, the organic layer separated, washed with 10% tartaric acid solution, 10% sodium bisulfite solution and water and then dried over anhydrous magnesium sulfate. Evaporation of the ether under reduced pressure gave a waxy solid product. Purification of a sample of the product for analysis and evaluation was accomplished by extraction of an ether solution of the crude product with aqueous sodium bicarbonate solution, acidification of the aqueous extract with dilute hydrochloric acid and drying of the ether solution of the product with anhydrous magnesium sulfate. Evaporation of the ether under reduced pressure gave a sample of the desired product containing 81.9% of the compound as determined by active oxygen assay

EXAMPLES VII–XX

By the same general methods described in Examples I to VI, the following additional novel mono peresters of α,α-disubstituted malonic acids (structure II) were prepared:

$$\text{II.} \quad [\text{HOOC}-\underset{\underset{R_3}{|}}{\overset{R_2}{\overset{|}{C}}}-\text{COO}]_n-R_1$$

| Example | $R_2$ | $R_3$ | $n$ | $R_1$ |
|---|---|---|---|---|
| VII | $C_2H_5-$ | $C_2H_5-$ | 1 | $t$-$C_4H_9-$ |
| VIII | $C_2H_5-$ | $CH_3-$ | 1 | $t$-$C_4H_9-$ |
| IX | $n$-$C_4H_9-$ | $n$-$C_4H_9-$ | 1 | $t$-$C_4H_9-$ |
| X | $C_2H_5-$ | $n$-$C_4H_9-$ | 1 | $t$-$C_4H_9-$ |
| XI | $ClCH_2-$ | $ClCH_2-$ | 1 | $t$-$C_4H_9-$ |
| XII | 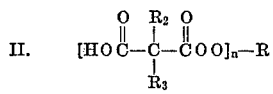 | $CH_3-$ | 1 | $t$-$C_4H_9-$ |
| XIII | $(CH_2)_3$ | | 1 | $t$-$C_4H_9-$ |
| XIV | $(CH_2)_5$ | | 1 | $t$-$C_4H_9-$ |
| XV | $CH_3-$ | $CH_3-$ | 1 | $t$-$C_5H_{11}-$ |
| XVI | $CH_3-$ | $CH_3-$ | 1 | $(CH_3)_3C-CH_2-\underset{\underset{CH_3}{|}}{\overset{CH_3}{\overset{|}{C}}}-$ |
| XVII | $CH_3-$ | $CH_3-$ | 2 | $-\underset{\underset{CH_3}{|}}{\overset{CH_3}{\overset{|}{C}}}-C\equiv C-\underset{\underset{H_3}{|}}{\overset{CH_3}{\overset{|}{C}}}-$ |
| XVIII | $C_2H_5-$ | $C_2H_5-$ | 1 | $(CH_3)_3C-CH_2-\underset{\underset{CH_3}{|}}{\overset{CH_3}{\overset{|}{C}}}-$ |
| XIX | $C_2H_5-$ | $C_2H_5-$ | 1 | Pinanyl- |
| XX | $C_2H_5-$ | $C_2H_5-$ | 1 | $HO\overset{CH_3}{\underset{CH_3}{C}}H-CH_2-\underset{\underset{CH_3}{|}}{\overset{CH_3}{\overset{|}{C}}}-$ |

EXAMPLES XXI–XXVI

In addition, the following carboxy-containing peresters of structure I, which are useful in the process, were prepared by reacting the corresponding anhydrides with t-butyl hydroperoxide:

| Example | Anhydride used | Carboxy-perester obtained |
|---|---|---|
| XXI | Succinic | $t$-$C_4H_9OO\overset{O}{\overset{\|}{C}}CH_2CH_2\overset{O}{\overset{\|}{C}}OH$ |
| XXII | Maleic | $t$-$C_4H_9OO\overset{O}{\overset{\|}{C}}CH=CH\overset{O}{\overset{\|}{C}}OH$ |
| XXIII | Methylsuccinic | $t$-$C_4H_9OO\overset{O}{\overset{\|}{C}}-\underset{\underset{CH_3}{|}}{CH}-CH_2-\overset{O}{\overset{\|}{C}}OH$ |
| XXIV | Glutaric | $t$-$C_4H_9OO\overset{O}{\overset{\|}{C}}CH_2CH_2CH_2\overset{O}{\overset{\|}{C}}OH$ |
| XXV | Phthalic | $t$-$C_4H_9-OO\overset{O}{\overset{\|}{C}}\underset{\text{(benzene ring)}}{\phantom{X}}\overset{O}{\overset{\|}{C}}OH$ |
| XXVI | Hexahydrophthalic | $t$-$C_4H_9-OO\overset{O}{\overset{\|}{C}}\underset{\text{(S ring)}}{\phantom{X}}\overset{O}{\overset{\|}{C}}OH$ |

TEST XXVII

To illustrate the remarkable effect on the peroxide stability, the half-lives of the peroxides were determined in aqueous solution with and without the presence of an alkaline buffering agent and compared to the half-life in benzene at the same temperature: the data are presented in Table I.

TABLE I.—HALF-LIFE DATA OF 0.2 MOLAR SOLUTIONS OF CARBOXY-PERESTERS

| Carboxy-perester | Assay, percent | Temperature, °C. | | (Time, half hours) | | |
|---|---|---|---|---|---|---|
| | | Benzene | Water | Benzene | Water pH ca. 2 | Water pH ca. 7.58* |
| t-Butyl peroxy(α-carboxy)-isobutyrate $HO\overset{O}{\overset{\|}{C}}-\underset{\underset{CH_3}{|}}{\overset{CH_3}{\overset{|}{C}}}-\overset{O}{\overset{\|}{C}}-OOC(CH_3)_3$ (from Example I) | 98.7 | 70 | 70 | 14.2 | 4.4 | 1.9 |
| t-Butyl peroxy(2-carboxy-2-ethyl)butyrate $HO\overset{O}{\overset{\|}{C}}-\underset{\underset{C_2H_5}{|}}{\overset{C_2H_5}{\overset{|}{C}}}-\overset{O}{\overset{\|}{C}}-OOC(CH_3)_3$ (from Example VII) | 92 | 70 | 70 | 9.9 | 4.3 | 0.89 |
| t-Butyl peroxy(1-carboxy)-cyclohexanecarboxylate $HO\overset{O}{\overset{\|}{C}}\underset{\text{(S ring)}}{\phantom{XX}}\overset{O}{\overset{\|}{C}}-OOC(CH_3)_3$ (from Example XIV) | 91.6 | 70 | 70 | 6.3 | ---------- | 0.74 |

TABLE I—Continued

| Carboxy-perester | Assay, percent | Temperature, °C. Benzene | Temperature, °C. Water | (Time, half hours) Benzene | (Time, half hours) Water pH ca. 2 | (Time, half hours) Water pH ca. 7.58* |
|---|---|---|---|---|---|---|
| t-Butyl peroxy-1-carboxycyclobutanecarboxylate | 91.6 | 85 | 70 | 19.3 | | 9.5 |

$$\underset{CO_2H}{\underset{|}{\square}}\!\!-\!\!COOC(CH_3)_3$$

(from Example XIII)

| t-Butyl peroxy-3-carboxypropionate | 98.3 | 85 | 85 | ≈170 | 7.9 | 8.8 |
| | | 100 | | 25 | | |

$$(CH_3)_3C\!-\!OO\overset{O}{\overset{\|}{C}}\!-\!CH_2CH_2\overset{O}{\overset{\|}{C}}\!-\!OH$$

(from Example XXI)

| t-Butyl peroxy-4-carboxybutyrate | 93 | 100 | 85 | 14.1 | | 12.0 |

$$(CH_3)_3C\!-\!OO\!-\!\overset{O}{\overset{\|}{C}}\!-\!CH_2\!-\!CH_2\!-\!CH_2\!-\!\overset{O}{\overset{\|}{C}}\!-\!OH$$

(from Example XXIV)

| t-Butyl peroxy-3-carboxyacrylate | 100 | | 85 | | 82.8 | 10.6 |

$$(CH_3)_3C\!-\!O\!-\!O\!-\!\overset{O}{\overset{\|}{C}}\!-\!CH\!=\!CH\!-\!\overset{O}{\overset{\|}{C}}\!-\!OH$$

(from Example XXII)

| t-Butyl peroxy-methylsuccinic acid | 100 | 100 | 85 | 7.8 | | 5.9 |

$$(CH_3)_3COO\overset{O}{\overset{\|}{C}}\!-\!\overset{CH_3}{\underset{|}{C}H}\!-\!CH_2\!-\!CO_2H$$

(from Example XXIII)

*Aqueous systems highly buffered with excess sodium bicarbonate.

EXAMPLES XXVIII–XXXVII

To illustrate the process of this invention, emulsion polymerization were carried out by the general methods described and the results are tabulated in Tables II and III.

Emulsion polymerization of styrene (general procedure)

The emulsifier (4.8 g.) added to a 250 ml. flask and 120 g. of water is added. The mixture is stirred and heated to dissolve the emulsifier. To the mixture, 40 g. of styrene is added, the flask flushed with nitrogen and the weighed initiator added.

At the end of the run, the flask is cooled to 20° C. and 0.5 ml. of 0.2% hydroquinone solution added to stop the reaction.

The yield of polystyrene is determined by placing 5.00 g. of the emulsion into a weighed aluminum dish, allowing the dish to dry for 4 hours in a current of air in a hood and completing the drying at 50° C. under vacuum. The percent solids obtained is compared to the calculated percent solids to obtain the actual conversion percent.

Emulsifiers used were 2.0 g. of Ivory Snow® (soap) or Triton X-200® as above.

Emulsion polymerization of acrylates (general procedure)

The emulsion system contains 62.5 g. of deionized water, 6.0 g. of Triton X-200, 50.0 g. of methyl methacrylate or ethyl acrylate and the initiator. The run is carried out under a nitrogen gas blanket. At the end of the reaction a small amount of hydroquinone is added to inhibit further polymerization.

The conversion percent is determined as above.

Emulsion polymerization of vinyl chloride (general procedure)

To a cappable 12 oz. bottle, 6.0 g. of Triton X-200, 144 g. of water and 50 g. of vinyl chloride was added. The bottle was chilled to −20° C., the initiator (and activator) was added and the bottle capped. The polymerization was carried out by agitating the bottle in a water bath at the desired temperature for the desired time. The polymerization was stopped by chilling the bottle, venting the unreacted vinyl chloride and the percent conversion determined as above.

Note. "phr." in Tables II and III means part sper 100 parts of monomer charged, as is shown in the procedures.

EXAMPLE XXXVII-B t-Butyl peroxy-3-carboxyacrylate (from Example XXII) was also used in the emulsion polymerization of methyl methacrylate at 81–85° C. at a concentration of $2.22 \times 10^{-3}$ moles per hundred grams of monomer. Rohm and Haas's Triton X-200 was the emulsifier used. The polymerizations were carried out under nitrogen for 8 hours using sodium bicarbonate to keep the pH of the system near neutral. Under these conditions, a 98.2% conversion to poly(methyl methacrylate) was obtained while without the carboxy-perester, only a 10.0% conversion was obtained otherwise identical conditions.

TABLE II

[Emulsion polymerization using t-butyl peroxy-α-carboxyisobutyrate (from Example I) Initiator at 50° C.]

| Example | Monomer | Initiator concentration phr. | pH (approximate) | Time (hours) | Conversion, percent |
|---|---|---|---|---|---|
| XXVIII | Ethyl acrylate | 0.61 | 8.2 | 1 | 97 |
| | | 0.61 | 2 | ¹ 5.5 | 23.5 |
| XXIX | Styrene | 0.61 | 8 | 1.25 | 74.4 |
| | | 0.18 | 8 | 6 | 89.8 |
| | | 0.30 | 2 | ² 3 | 91.9 |
| XXX | Vinyl acetate | 0.5 | 8 | 16 | 42.5 |
| XXXI | Vinyl chloride | 0.5 | 2 | 16 | 29.8 |

¹ 25° C.
² Exotherm to 70° C.

TABLE III

[Emulsion polymerization of styrene at 50° C.]

| Example | Initiator | Initiator phr. | Time (hours) | pH (approximate) | Conversion, percent |
|---|---|---|---|---|---|
| XXXII | t-Butyl peroxy-2-carboxy-cyclohexanecarboxylate | 0.77 | 7 | 3.4 | 76.7 |
| | $\begin{array}{c}\text{C-OOC(CH}_3\text{)}_3\\ \text{C-OH}\end{array}$ on cyclohexane | | | | |
| | | 0.77 | 6 | 7.2 | 84.1 |
| | (from Example XXVI) | | | | |
| XXXIII | t-Butyl peroxy-2-carboxybenzoate | 0.75 | 6 | 3.2 | 4.6 |
| | $\begin{array}{c}\text{C-OOC(CH}_3\text{)}_3\\ \text{C-OH}\end{array}$ on benzene | | | | |
| | | 0.75 | 6 | 8.2 | 8.6 |
| | (from Example XXV) | | | | |
| XXXIV | t-Butyl peroxy-3-carboxypropionate | 0.75 | 6 | 3.0 | 3.5 |
| | $(CH_3)_3C-O-O-\overset{O}{\overset{\|}{C}}-CH_2CH_2\overset{O}{\overset{\|}{C}}-OH$ | 0.75 | 6 | 8.0 | 82.7 |
| | (from Example XXI) | | | | |
| XXXVII A | t-Butyl peroxy-3-carboxyacrylate | | | | |
| | $(CH_3)_3C-O-O-\overset{O}{\overset{\|}{C}}-CH=CH-\overset{O}{\overset{\|}{C}}-OH$ | 0.75 | 6 | 2.0 | 6.1 |
| | | 0.75 | 6 | 8.4 | 19.9 |
| | (from Example XXII) | | | | |
| XXXV | t-Butyl "peroxymethylsuccinic acid" mixed isomers | 0.81 | 6 | 3.4 | 5.5 |
| | $(CH_3)_3C-O-O-\overset{O}{\overset{\|}{C}}-\underset{\underset{CH_3}{\|}}{CH}-CH_2-\overset{O}{\overset{\|}{C}}-OH$ | 0.81 | 6 | 7.8 | 33.3 |
| | (from Example XXIII) | | | | |
| XXXVI | t-Butyl peroxy-4-carboxybutyric acid | 0.81 | 7 | 3.5 | 7.1 |
| | $(CH_3)_3C-O-O-\overset{O}{\overset{\|}{C}}-CH_2CH_2CH_2\overset{O}{\overset{\|}{C}}OH$ | 0.81 | 7 | 8.2 | 9.2 |
| | (from Example XXIV) | | | | |

EXAMPLE XXXVIII

Using t-butyl peroxy-2-carboxy-2-ethylbutyrate (from Example VII) as the initiator at a level of 0.75 phr., the emulsion polymerization of styrene was carried out for 6 hours at 50° C. Using Triton X-200 as the emulsifying agent at pH 2.0, a 96.9% conversion to polystyrene was obtained. At pH 7.8, and using Ivory Snow as the emulsifying agent, a 90.8% conversion to polystyrene was obtained.

EXAMPLE XXXIX

The emulsion polymerization of vinyl chloride was carried out using t-butyl peroxy-2-carboxy-2-ethyl-butyrate as the initiator for 16 hours at 50° C. In a system using 0.28 phr. of the initiator, buffered at pH 8.4 with sodium bicarbonate, a 90% conversion to poly(vinyl chloride) was obtained. In a non-buffered system, at pH 2.6, and initiator in the range of 0.24–0.39 phr., a maximum conversion of 47% was obtained. Using a mixture of 0.517 phr. of diethylmalonic acid and 0.219 phr. of t-butyl hydroperoxide at 50° C. for 16 hours, no polyvinyl chloride was obtained.

TEXT XL

In a series of reactions run at pH 8.0 to check the possibility of initiation of polymerization as a result of saponification of the perester as the first step in the reaction, the polymerization of styrene was carried out at 50° C.

| Initiator | Phr. | Time, hrs. | Percent conversion |
|---|---|---|---|
| t-Butyl hydroperoxide | 0.135 | 7.2 | 7.5 |
| t-Butyl hydroperoxide diethylmalonic acid | { 0.291<br>0.517 } | 6.0 | 7.0 |
| t-Butyl peroxy-2-carboxy-2-ethylbutyrate | 0.75 | 6.0 | 90.8 |

The concentrations of the t-butyl hydroperoxide and diethylmalonic acid in the mixture are approximately those which would be obtained by the saponification of the perester at the level used.

EXAMPLE XLI

Using 0.75 phr. t-butyl peroxy-1-carboxycyclohexanecarboxylate (from Example XIV) as the initiator in the emulsion polymerization of styrene for 6 hours at 50° C. the following results were obtained:

| Emulsifying agent | pH | Percent conversion |
|---|---|---|
| Ivory Snow | 8.1 | 93.5 |
| Triton X-200 | 2.4 | 77.4 |

EXAMPLE XLII

Using the same initiator as in Example XLI in the emulsion polymerization of vinyl chloride at 50° C. for 16 hours the following results were obtained in systems buffered with sodium bicarbonate and unbuffered systems.

| Buffered, pH=8 | | Unbuffered, pH=5 | |
| --- | --- | --- | --- |
| Perester, g. | Percent conversion | Perester, g. | Percent conversion |
| 0.25 | 86 | 0.25 | 59 |
| 0.26 | 90 | 0.33 | 74 |
| 0.33 | 98 | | |

It is evident that excellent conversions of PVC can be obtained at almost neutral pH's using the peresters of the present disclosure to initiate the polymerization.

EXAMPLES XLIII–L

The novel α-carboxy-peresters of the present disclosure are also useful as free-radical sources in nonaqueous systems and they can be used in applications where conventional peroxides are used e.g. in the curing of polyester resins. This is illustrated in Examples XLIII to L where an unsaturated polyester resin was made by reacting maleic anhydride (1.0 mole), phthalic anhydride (1.0 mole), and propylene glycol (2.2 moles) until an acid number of 45–50 was obtained. To this was added hydroquinone at a 0.0137 concentration. Seven parts of this unsaturated polyester was diluted with 3 parts of monomeric styrene to obtain a homogeneous blend having a viscosity of 13.08 poise and a specific gravity of 1.14.

To 20 grams of this blend was added sufficient α-carboxy-perester to be equivalent in active oxygen to a one percent dibenzoyl peroxide concentration of the blend. The resultant compositions were placed in a constant temperature bath at 82° C. The internal temperature was recorded as a function of time. The gel times, cure times, peak exotherm and Barcol hardness of the cured samples are reported in Table IV.

TABLE IV

Curing an Unsaturated Polyester-Styrene Resin With Novel α-Carboxy Peresters

| Example | Assay, percent | α-Carboxy-perester of Example | Minutes Gel | Minutes Cure | Peak, ° F. | Barcol |
| --- | --- | --- | --- | --- | --- | --- |
| XLIII | 100 | I | 4.4 | 6.3 | 393 | 40–45 |
| XLIV | 92 | VII | 2.5 | 3.8 | 404 | 45–50 |
| XLV | 78 | V | 2.7 | 3.9 | 408 | 45–50 |
| XLVI | 47.5 | III** | 0.6 | 1.5 | 408 | 40–45 |
| XLVII | 94 | XIII | 20.4 | 25.1 | 347 | 35–40 |
| XLVIII | 91.6 | XIV | 1.9 | 3.1 | 401 | 40–45 |
| XLIX | 81.9 | VI | 5.7 | 8.0 | 392 | 35–40 |
| L | 78.9 | X | 2.4 | 4.0 | 408 | 45–50 |

**1% by weight of III was used in this example.

EXAMPLE LI

Other non-aqueous or organic medium applications where the novel carboxy-perester can be used are in the suspension, bulk, and solution polymerizations of vinyl monomers. Example LI illustrates one of these uses.

t-Butyl peroxy-2-carboxy-2-ethylbutyrate (from Example VII) was used at a concentration of 0.2 part per hundred parts of monomer to polymerize vinyl chloride in a suspension polymerization system at 50° C. for 16 hours using the following procedure:

To a 12 oz. cappable bottle, 105 ml. of deionized water, 5 ml. of Tween 60, 5 ml. of Span 60, 10 ml. of Methocel (1500 cps.) and 50 g. of vinyl chloride was added. The resulting mixture was chilled to −20° C., the initiator added and the bottle capped. The polymerization was then carried out by agitating the bottle in a water bath at the desired temperature for the desired time. Polymerization was stopped by chilling the bottle, venting the unreacted vinyl chloride and weighing the polymer obtained to determine the percent conversion.

With the system at pH 8 and also at pH 3.4, the conversions of polyvinyl chloride obtained were 90% in both cases.

In suspension polymerization systems, the free radicals from the initiator must be generated in the organic phase (monomer) and not in the water phase as in emulsion systems. Therefore pH should have no effect (as shown above) and the rate of polymerization is dependent upon the decomposition rate of the peroxy ester in the organic medium and not in the water medium.

Thus, having described the invention, what is claimed is:

1. A compound of the formula:

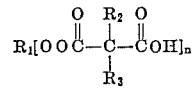

where:
(1) $n$ is 1 or 2;
(2) $R_1$ is an alkyl, alkylene, alkynyl, alkynylene, hydroxysubstituted alkyl, alkylene, alkynyl or alkynylene, cycloalkyl, hydrocarbon aralkyl, alkylcycloalkylalkyl or hydrocarbon alkylaralkyl radical of 4–20 carbons wherein the carbon atom joined to the peroxy oxygen atom is a tertiary carbon atom;
(3) $R_2$ and $R_3$ are alkyl of 1–12 carbons, cycloalkyl of 4–6 carbons, phenyl, lower-alkyl substituted phenyl or chloromethyl, and one of $R_2$ or $R_3$ can be trimethylacetoxymethyl; and
(4) $R_2$, $R_3$ and C together can form a cycloalkyl biradical having 4–6 carbons.

2. Claim 1 wherein $R_2$ and $R_3$ are alkyl of 1–12 carbons or chloromethyl and one of $R_2$ or $R_3$ can be trimethylacetoxymethyl.

3. t-Butyl peroxy-α-carboxyisobutyrate.

4. t-Butyl peroxy (1-carboxy)-cyclohexanecarboxylate.

5. t-Butyl peroxy-2-carboxy-2-phenylbutyrate.

6. 1,1,4,4 - tetramethyltetramethylene bis(peroxy-α-carboxyisobutyrate.

7. t-Butyl peroxy-2-carboxy-2-ethylbutyrate.

References Cited

Gortler et al., J. Org. Chem., vol. 31, pp. 3821–3 (November 1966).

JAMES A. PATTEN, Primary Examiner

U.S. Cl. X.R.

260—75 T, 89.1, 89.5 AW, 92.8 W, 93.5 W, 408, 413, 488 R, 488 CD, 488 J, 488 H, 514 R, 515 A, 515 M, 526 S, 526 R, 526 N, 537 R, 537 S